INVENTOR
PETER RIDGWAY WATT
BY Irvin D. Thompson
ATTY.

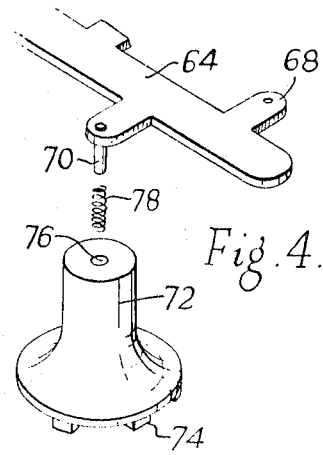
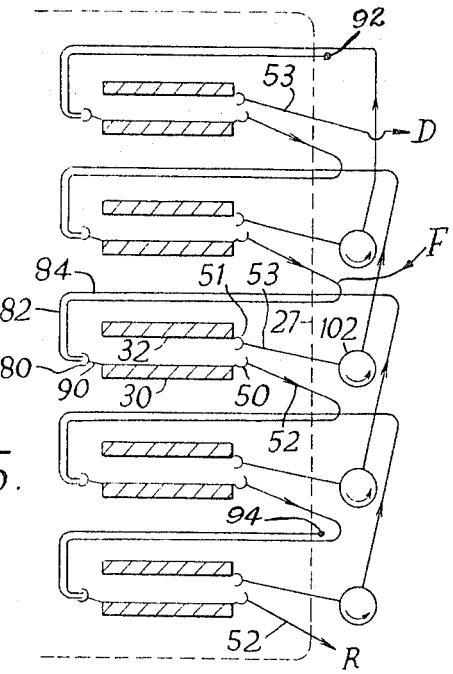
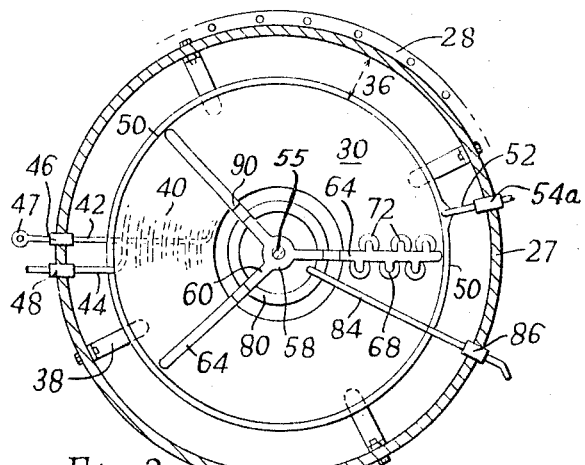
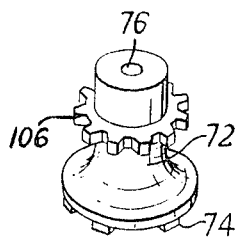

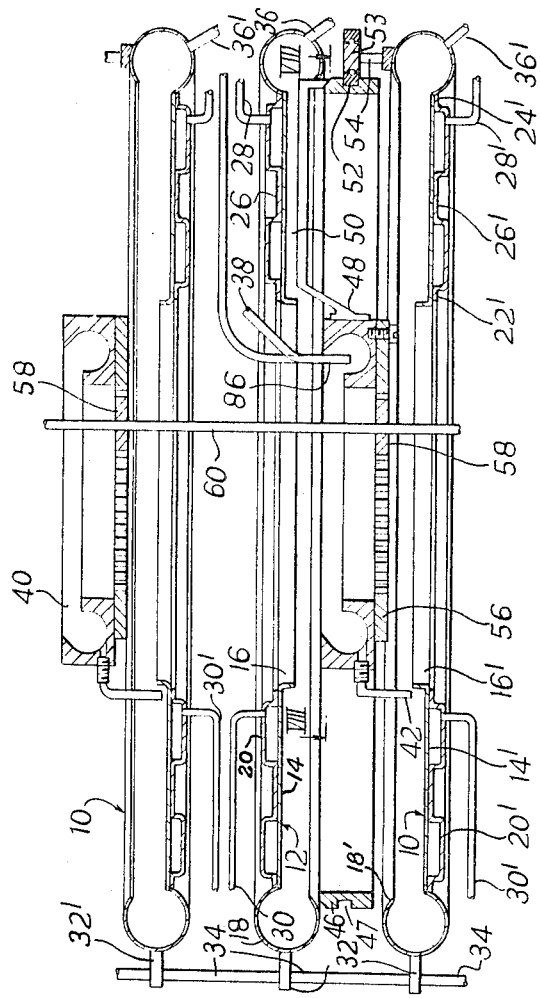

INVENTOR
PETER RIDGWAY WATT

United States Patent Office 3,271,271
Patented Sept. 6, 1966

3,271,271
MOLECULAR STILL HAVING STATIONARY EVAPORATOR AND CONDENSER SURFACES
Peter Ridgway Watt, Reigate, Surrey, England, assignor to Vitamins Limited, London, England, a British company
Filed May 8, 1962, Ser. No. 193,259
Claims priority, application Great Britain, May 12, 1961, 17,441/61
8 Claims. (Cl. 202—173)

The present invention relates to distillation apparatus and is particularly concerned with an improved molecular still for the distillation of liquid from thin moving films.

Molecular stills are known, in which the distilland is repeatedly evaporated in successive stages within one apparatus until the desired separation of components of the liquid is achieved; such stills are obviously advantageous compared with a number of separate stills connected in series, since only one vacuum chamber and pumping system are required. The present invention provides a very compact form of molecular still made up of a series of similar units or modules, in which any number of units can be built up to provide a still of the desired separating power, and a single drive unit can be arranged to drive all the moving parts.

In known molecular stills, the evaporating surfaces frequently are of elaborate construction and heavily lagged to reduce heat losses. The evaporators of the apparatus of the invention are light in weight and have heating means located very near their surfaces. High heat transfer is thus possible with only a small temperature differential across the surface, and overheating is minimised; the evaporator furthermore need not be lagged. The evaporator and condenser surfaces are preferably of simple and identical construction.

Many prior stills have rotating evaporators, or condensers and evaporators, using centrifugal force to spread the films of liquids. In the still of the invention, the evaporators and condensers are stationary, and the only moving parts are wipers, and, in the preferred construction, a gutter for distributing feed liquid to each evaporator. These parts are relatively light in weight, and are readily rotated.

According to the broadest aspect of this invention, molecular distillation apparatus comprises a plurality of stationary, heatable, vertically-spaced, upwardly-facing evaporator surfaces, a stationary, coolable, downwardly-facing condenser surface disposed above each evaporator surface, wiping means movable over each evaporator surface and arranged to displace a liquid film on such surface towards the outer periphery of each surface, means for transferring distillate from the outer periphery of each condenser surface to the next higher evaporator surface, and means for transferring residual distilland from the outer periphery of each evaporator surface to the next lower evaporator surface.

Preferably, at least one condenser wiper, rotatable about the vertical axis of the still, is also provided for wiping distillate toward the outer edge of the condenser surface to prevent the build-up of insulating layers of distillate.

The evaporator and condenser surfaces are preferably the upper and lower surfaces respectively of evaporators and condensers of identical form, namely a flat horizontal annular plate having a rim round its central aperture and a gutter at its outer edge for the collection of the residual distilland or the distillate, respectively; such plates may conveniently be formed by welding together two metal sheets so as to leave channels therebetween for the passage of heating or coolant fluids.

The evaporator wiper assemblies serve to spread the film of distilland over the evaporator surface to ensure even evaporation and to prevent local overheating; in preferred embodiments of such assemblies, such as are described in my co-pending applications Nos. 245,757 and 245,758 (assigned to the same assignee as this application), the wipers move the film constantly outward without imparting any inward component of movement to the film. Preferably, at least two wiper assemblies, e.g. three, are provided for each evaporator, and in a preferred embodiment these are attached to and are rotatable with a gutter into which distilland is fed and from which it is distributed around the inner portion of the evaporator surface.

The above-mentioned parts are all enclosed in a conventional vacuum chamber, which is suitably of vertical cylindrical construction, with dished ends, of which the base at least is detachable to permit access to the interior; if desired, the cylindrical portion may be constructed in modular sections. The chamber need not be thermally lagged, since no appreciable heat reaches the chamber from the evaporators. The chamber is evacuable by means of a high vacuum pumping system.

All the moving parts, namely the wipers and the distilland feed gutters, can be driven from one drive unit, situated either inside or outside the vacuum chamber.

The interconnections of the evaporators and condenser for the transfer of distillate, distilland and residue may be made externally in conjunction with apertures in the wall of the chamber, or all the connections may be made internally apart from the supply of the initial distilland.

Two embodiments of apparatus according to the invention are described below with reference to the drawings, in which:

FIG. 3 shows a plan view on the line 3—3 of FIG. 1, but with certain of the pipe connections displaced;

FIG. 4 is an exploded perspective view of part of a wiper arm;

FIG. 5 shows schematically one method of interconnecting five modules; and

FIG. 6 shows in perspective another form of wiper, in which:

FIG. 7 is a diagrammatic axial section of one module and parts of a second module of another embodiment of still.

Figure 1:
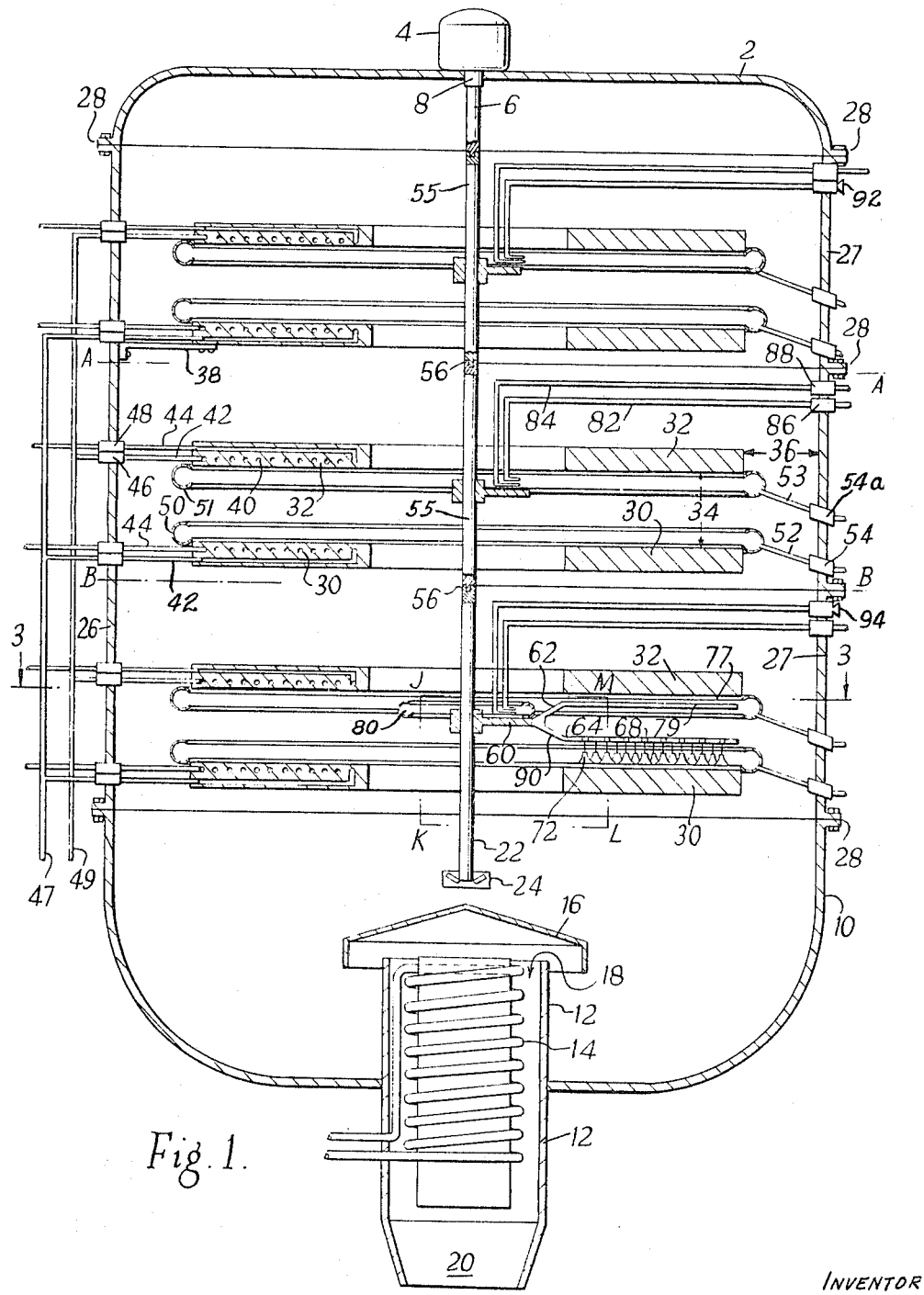
FIG. 1 shows diagrammatically an axial section of one embodiment of an entire still containing three modules.

Referring to FIG. 1, the non-modular portions of the still are described first. At the upper end there is a dish-shaped portion 2 of vacuum chamber, and a motor 4 with an attached portion 6 of a central shaft which passes into the chamber through a seal 8. At the lower end is a cup-shaped portion 10 of vacuum chamber with inward and outward extensions 12 which surround an extra vapour condenser 14. A hood 16 prevents droplets of liquid from falling into this condenser, and constrains the gases and vapours to take the path indicated by the arrow 18 so that they pass close to the condenser 14. A high-vacuum pumping system (not shown) is attached beyond the condenser, at 20. At the lower end of the still there is also a terminal portion 22 of the central shaft, resting on thrust bearings 24 which are supported on the base 10 of the chamber by supports (not shown).

The cylindrical wall of the vacuum chamber may be made either in a single length suitable for three modules, as shown 26 in the left-hand side of FIG. 1, or in modular portions as shown on the right-hand side 27. This wall is pierced by unions to which pipes are attached, as described below. All the portions of the vacuum chamber are flanged and are bolted together with sealing rings in a gas-tight manner as shown at 28.

The remainder of the still is of modular construction and a single module, such as that lying between the lines A—A and B—B in FIG. 1, will now be described. Referring to FIGS. 1 and 3, an evaporator 30 and a condenser 32 each have the form of a flat annular plate, and their wiped surfaces are separated by the distance 34, whilst they are spaced a distance 36 from the chamber wall sufficient to provide adequate pumping space and thermal insulation. The wiped members are supported by, for instance, brackets 38 attached to the chamber wall (see FIG. 3).

Figure 2:
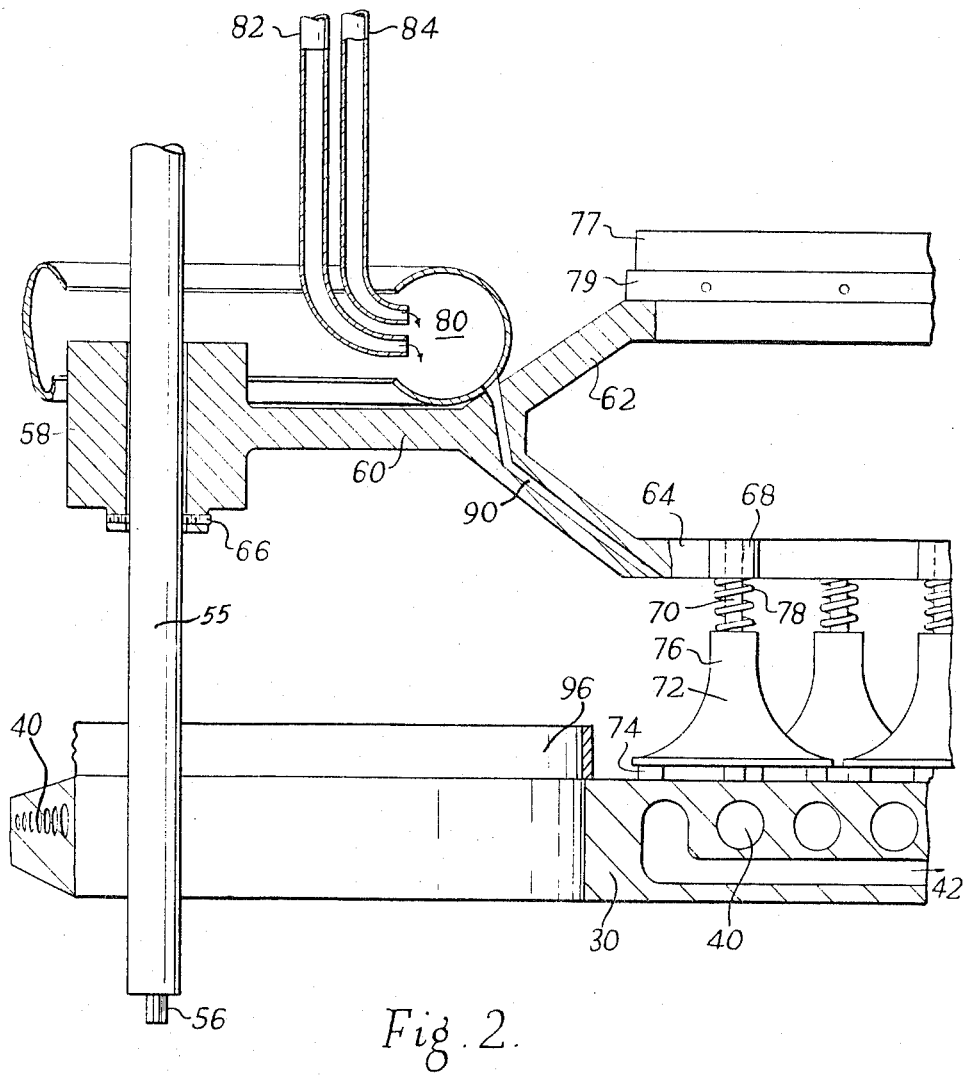
FIG. 2 is an enlargement of the portion of FIG. 1 enclosed by the broken lines JKLM.

The evaporator and condenser contain passages for the circulation of fluid for respectively heating and cooling the wiped surfaces; such passages are indicated in cross-section at 40 in the left-hand side of FIG. 1 and in FIG. 2 and are partially shown (dotted lines) in plan in FIG. 3. Inlet and outlet pipes 42 and 44 connect with unions 46 and 48 which are integral with the pressure wall. Hot and cold fluid is supplied by means of pipes threaded into the outer portions of the unions 46 and 48; such pipes may be interconnected outside the still as shown at 47 and 49 in FIG. 1.

Annular gutters 50 and 51 (FIGS. 1 and 3) are fixed to the outer edges of the wiped members 30 and 32 so as to collect the residue therefrom, and from a point at the bottom of each gutter a pipe 52 or 53 leads to a union 54 or 54a integral with the pressure wall.

The rotating component of the module is carried on a portion 55 of the central shaft (FIGS. 1–3) with pin and socket connections 56 to the neighbouring portions of shaft so that the entire shaft is rotatable by the motor 4. A framework carrying the wiper elements consists of a collar 58 around the shaft 55 and three rods 60, each rod bifurcate into upper and lower wiper arms 62 and 64. The collar 58 is adjustably secured to the shaft 55 by, for instance, grub screws 66 (FIG. 2). Each lower wiper arm bears alternating projections 68 (FIGS. 2–4), to which the wiper elements are attached by means of spindles 70. Each wiper element 72 is shaped as shown in FIGS. 2 and 4 and bears small projections 74 on its base of a resilient material of low coefficient of friction, such as polytetrafluoroethylene; the spindle 70 fits into a hole 76, and the wiper element is held in contact with the evaporator 30 by means of a spring 78. Each upper wiper arm bears only a single fixed longitudinal wiper blade 77 clamped in bearer 79. The wiper element 72 may bear rings of gear teeth 106 (FIG. 6), by which they are interconnected.

An annular gutter 80 (FIGS. 1–3) is attached to the upper surface of the rods 60, and two pipes 82 and 84 (only one of which is shown in FIG. 3) lead distilland thereinto from unions 86 and 88 integral with the wall of the vacuum chamber. A passageway 90 is drilled in the sloping portion of the wiper arms 64 (see especially FIG. 3) and feeds distilland from the gutter 80 onto the evaporator 30.

Before operating the still, it is necessary to interconnect the modules. The most usual manner in which this may be done is shown diagrammatically, for a five-module still, in FIG. 5. This diagram shows in vertical section the wiped elements 30 and 32, the outer and inner gutters 50, 51 and 80, the delivery passageway 90 and the pipes 52, 53, 84 and 82, and the chamber wall 27 (dotted line), all corresponding to the right-hand side of FIG. 1, but with five modules instead of three. It will be seen that by means of connections made outside the still, the undistilled residue from each lower outer gutter 50 is transferred via the pipe 52 by gravity into the pipe 84 of the next lower module, and thence into the inner gutter 80 and onto the next lower evaporator 30; contrariwise, the distillate from each upper outer gutter 51 is transferred via the pipe 53 through a transfer pump 102 to the pipe 82 of the next higher module and so onto the next higher evaporator 30. The pipe 82 of the module at the top of the still is sealed off by a plug 92 (FIGS. 1 and 5) inserted in its union 86, and correspondingly the pipe 82 of the module at the bottom of the still is sealed off by a plug 94 in its union 88. The feed of crude distilland is led in from F (FIG. 5) to join the residue entering the pipe 84 of the module in the centre of the still; the final distillate is drawn off at D from the pipe 53 at the top of the still whilst the final residue is drawn off at R from the pipe 52 at the bottom of the still.

The operation of the still can now be described. The modules are interconnected in a manner such as just described in connection with FIG. 5. Cooling and heating fluids are circulated through the coils 40 of the condensers and evaporators. When the surfaces of the members 30 and 32 have reached their desired temperatures, and the chamber has been evacuated to the order of 0.1–0.001 mm. Hg then the motor 4 is started so as to rotate the spindle 6, 55, 22 and the attached framework 58, 60, 62, 64 wiper elements 70 and inner gutter 80. The projections 74 are held in contact with the members 30 by means of the springs 78 and the resultant of the vertical and lateral forces acting on the elements 72 causes them to rotate.

Feed liquid (crude distilland) is then admitted via the union 88 and the pipe 84 into the rotating gutter 80, of the middle module of the still. The liquid is flung toward the closed side of the gutter by centrifugal action, and is consequently forced down the conduits 90 and falls onto the inner margin of the evaporator 30. The liquid is rapidly spread into a thin film on the surface of the evaporator by the action of the wipers. The heat from the coils 40 in the evaporator causes the more volatile portion of the distilland to evaporate and to be condensed on the condenser 32 above. As more distilland falls onto the evaporater, the film is mixed up, and the less volatile residue is wiped towards the outer margin of the evaporator, whence it is flung by the wipers into the gutter 50 and thence runs by gravity down the pipe 52 and onto the next lower module. The film of condensate is similarly wiped toward the outer margin of the condenser 32, whence it is flung by the wipers into the outer gutter 51 and thence runs by gravity down the pipe 53 and to the pump 102 (FIG. 5) which raises it to the next higher module.

This process continues in the centre module, except that when distillation is established the liquid entering the inner gutter 80 is not just crude distilland (F in FIG. 5) but is mixed with residue from the next higher stage. The process of distillation and wiping operates in precisely the same manner in the other modules, and the supply and discharge therefrom has been described with reference to FIG. 5. Throughout the column, the less volatile material moves downwards and the more volatile material upwards. Eventually, a final residue is drawn off at the bottom of the column, and a final distillate from the top. The process can be carried out continuously for as long as desired so long as further crude distilland is supplied.

Various modifications in the structure of the still may be made, as follows. The cylindrical portion of the chamber wall may be either made in one piece or in modular portions; similarly, the central shaft may be made in one piece instead of in the sections shown. For the greatest flexibility of operation it is desirable that all components, including the wall and shaft, should be of modular form, but use of a wall made in one piece reduces the number of vacuum seals required.

The inner edges of both the wiped members are desirably turned inwards, or fitted with flanges, as shown at 96 for the evaporator in FIG. 2, so as to prevent any liquid from being flung off the surface inwards.

With small-scale apparatus, the vacuum chamber could be a bell jar upon a plate with a hole for admission of the extra vapour condenser and of electrical power supply. The motor and transfer pumps and all the interconnections between the modules would be inside the bell jar.

The method of interconnecting the modules may be varied. The method described with reference to FIG. 5 is normally to be used when a single distillate D or residue R, or both, are required; the point of entry of the feed F may, however be varied, bearing in mind that the greater the number of modules between the point of entry of the feed and the point of exit of the desired fraction, the greater the separation attained.

Figure 8:
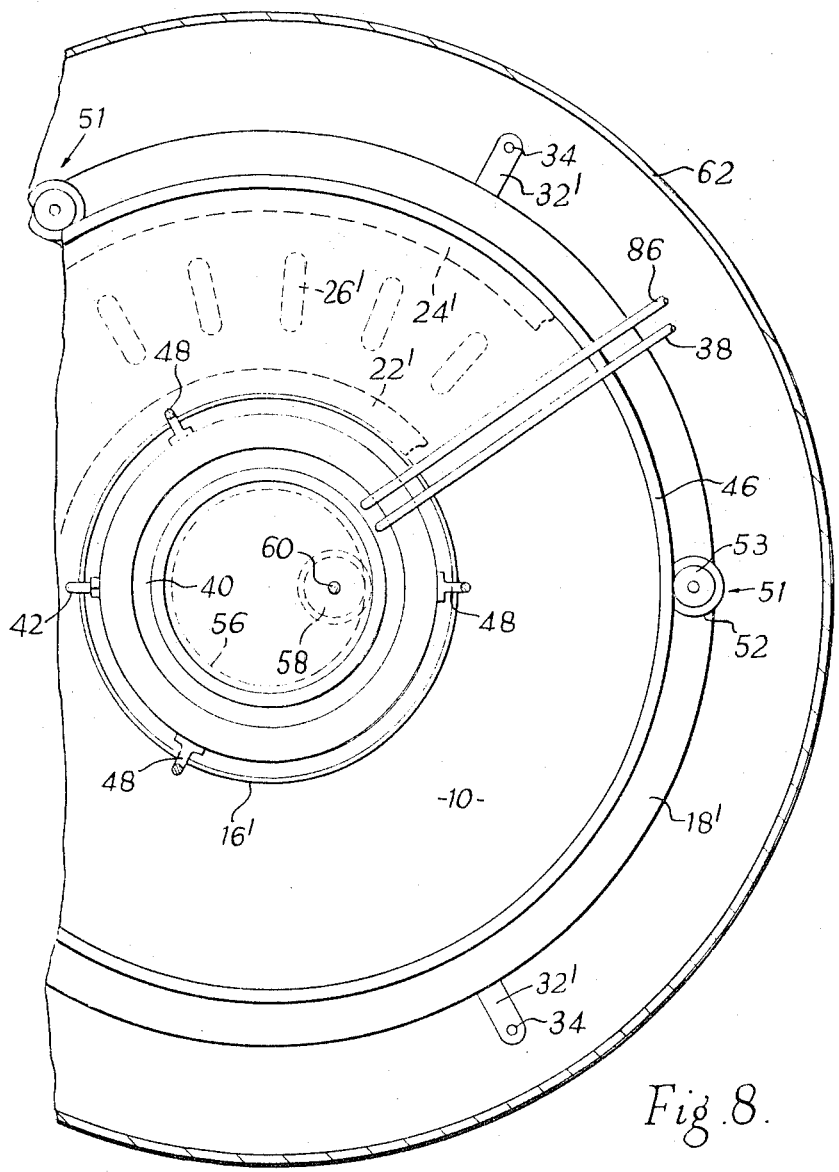
FIG. 8 is a partial plan view on the line VIII—VII of FIG. 7.

Referring to FIGS. 7 and 8, one module and the evaporator of a second module of another embodiment of still are shown; the reference numerals used on these figures correspond generally to those of my aforesaid co-pending applications Nos. 245,757-8.

The stationary parts of the apparatus shown include an evaporator surface, indicated generally at 10, and an apposed condenser surface, indicated generally at 12. These are of similar shape, in order to simplify construction and manufacture, and the condenser surface can be taken to be the same as the evaporator surface, substituting references to coolant inlets and outlets for references to heating fluid inlets and outlets.

The condenser surface 12 is constituted by an annular steel plate 14 having a dependent rim 16 at its inner edge and a peripheral gutter 18 of part-circular radial cross-section. A further annular steel plate 20 is welded to the upper side of the plate 14 by way of circular seam welds 22 and 24 adjacent the rim 16 and the gutter 18 respectively and also by way of a plurality of radial seam welds 26, whereby a space is defined between the plates 14 and 20 having the form of inner and outer concentric annuli joined by a number of wedge-like spaces between the welds 26. The welds 22, 24, 26 are shown in dotted lines over a portion of FIG. 8. A coolant inlet 28 is secured to the plate 20 at a point in the outer annular space and a coolant outlet 30 is secured to the plate 20 at a point in the inner annular space.

The evaporator surface 10 is constituted by an annular steel plate 14' having an upstanding rim 16' at its inner edge and a peripheral gutter 18' of part-circular cross-section. A further annular steel plate 20' is welded to the under side of the plate 14' by way of circular seam welds 22' and 24' adjacent the rim 16' and the gutter 18' respectively and also by way of a plurality of radial seam welds 26', whereby a space is defined between the plates 14' and 20' having the form of inner and outer concentric annuli joined by a number of wedge-like spaces between the welds 26'. A heating fluid inlet 28' is secured to the plate 20' at a point in the outer annular space and a heating fluid outlet 30' is secured to the plate 20' at a point in the inner annular space.

At separate points, preferably three equally spaced, lugs 32 and 32' project outwardly from the condensate gutter 18 and distilland gutter 18' respectively and are joined by struts 34, conveniently in the form of rods having threaded spigots and sockets, in order to secure the condenser and evaporator assemblies together, the rods between the lugs 32 and 32' controlling the spacing and parallelism of the condenser and evaporator surfaces 12 and 10. Delivery ducts 36 and 36' for condensate and distilland are secured to the gutters 18 and 18' at appropriate points.

A feed pipe 38 from the module below and a residue feed pipe 86 form the module above direct distillate to a rotary distributing gutter 40 mounted co-axially of and between the condenser and evaporator assemblies and the gutter 40 feeds distillate to the evaporator surface 10 by way of one or more pipes 42. The gutter 40 is supported for rotation by means of an outwardly-grooved guide ring 46, to which it is secured by means of a number of, preferably three, upwardly cranked spokes 48, which also serve to support upstanding scrapers, one of which is shown at 50, which rotate in contact with the condenser surface and effect wiping thereof. The groove 47 in the outer part of the guide ring 46 receives the outer raceways 51 of three ball bearing units 52, the inner raceways 53 of which are carried upon supports 54 secured for instance to points on the distilland gutter 18' which are also equally spaced and each diametrically opposite one set of the lugs 32 and 32'. As shown best in FIG. 8, the bearings 52 which support the rotary parts of the apparatus and the lugs 32 and 32' which support the stationary parts are spaced around the assembly at 60° to one another. The lugs 32 and 32' project outwardly sufficiently to allow the rotary assembly to be removed laterally, on dismantling one of the bearings 52, i.e. the distance between any two rods 34 is greater than the outer diameter of the guide ring 46.

Rotation can be effected in various ways, and, in one form, by means of an internal gear ring 56 secured to the distillate gutter 40 and meshing with a driving pinion 58 carried on a vertical layshaft 60. The gutter 40, driving pinion 58 and the evaporator 10 of a superposed unit are shown in FIG. 7.

In order to effect rapid film renewal by wiping the evaporator surface and also to effect lateral outward displacement of the distilland film and residual distilland towards the gutter 18', in the absence of the centrifugal action inherent in stills having rotary evaporators, at least one evaporator wiper assembly is provided, such as are described and illustrated in my aforesaid co-pending applications Nos. 245,757 and 245,758.

The modules are mounted in a vacuum chamber, such as is shown in cross-section at 62 in FIG. 8, and as has been described with reference to the embodiment of FIGS. 1 to 5. Appropriate connections for heating and cooling fluids and for the supply and removal of distillate and distilland are also provided, as is a motor for rotating the layshaft. As the transfer pumps, lift pumps may advantageously be used, and these may be connected by gearing to the guide ring of the rotary portion of a module.

The interconnection and operation of the modules is similar to that described above with reference to the embodiment of FIGS. 1 to 5.

I claim:

1. Molecular distillation apparatus comprising a plurality of stationary, heatable, vertically-spaced, upwardly-facing evaporator surfaces, a stationary, coolable, downwardly facing condenser surface disposed above each evaporator surface, wiping means movable over each evaporator and condenser surface and arranged to displace a liquid film on such surfaces towards the outer periphery of each surface, means for transferring distillate from the outer periphery of each condenser surface to the next higher evaporator surface, and means for transferring residual distilland from the outer periphery of each evaporator surface to the next lower evaporator surface.

2. Molecular distillation apparatus, comprising a plurality of stationary evaporator plates spaced apart from each other upon a common vertical axis, and each having a flat heatable upper surface, a stationary condenser plate having a flat coolable lower surface disposed above and parallel to each evaporator plate, wiping means movable over the upper surface of each evaporator plate and arranged to displace a thin film of distillate thereon towards the outer periphery of such surface, means for transferring distillate from the outer periphery of each condenser surface to the next higher evaporator surface, and means for transferring residual distilland from the outer periphery of each evaporator surface to the next lower evaporator surface.

3. Molceular distillation apparatus according to claim 1, in which the evaporator and condenser surfaces are annular, and in which the wiping means for each pair of such surfaces are carried on a wiping assembly located between each such pair of surfaces, such assembly being rotatable about a vertical axis passing centrally through the annular surfaces.

4. Molecular distillation apparatus according to claim 1, in which the evaporator and condenser surfaces are annular, the wiping means for each pair of such surfaces being carried on a wiping assembly located between each such pair of surfaces, such assembly being rotatable about a vertical axis passing centrally through the annular surfaces and which includes an annular gutter for supplying distilland to an inner portion of each evaporator surface, such gutter being attached to and rotatable with the wiping assembly.

5. Molecular distillation apparatus according to claim 1, in which the evaporator and condenser surfaces are annular, and wiping means for each pair of such surfaces being carried on a wiping assembly located between each such pair of surfaces, such assembly being rotatable about a vertical axis passing centrally through the annular surfaces and which includes a circular trackway formed in the periphery of the wiping assembly, and three support members equi-spaced around the periphery and engageable in the trackway for rotatably supporting the wiping assembly.

6. Molecular distillation apparatus according to claim 6, which includes a wiper movable over the lower surface of each condenser plate and arranged to displace a thin film of distillate thereon towards the outer periphery of such surface.

7. Molecular distillation apparatus according to claim 2, in which the evaporator and condenser plates are circular, and the wiping means comprises a horizontal frame member rotatable about the vertical axis of its associated evaporator plate, and a plurality of elements each dependent from the frame member, and held in wiping contact with the upper surface of the evaporator, each such element being rotatable about its own vertical axis.

8. A molecular still, comprising: a plurality of stationary, annular, evaporator plates spaced apart from each other upon a common vertical axis, each evaporator plate having a flat, upper evaporating surface means within each evaporator plate, for heating the upper surface thereof; a stationary, annular condenser plate disposed above and parallel to each evaporator plate, each condenser plate being of the same size as the evaporator plate therebelow, each condenser plate having a flat, lower-condensing surface parallel to the evaporating surface therebelow, means within each condenser plate for cooling the lower surface thereof; a wiper assembly and a plurality of support members being disposed between each such pair of evaporating and condensing surfaces, such assembly comprising a framework having a peripheral circular trackway engageable in the support members such that the framework is rotatable about a vertical axis concentric with the axes of the associated pair of surfaces, a wiper for the evaporating surface and a wiper for the condensing surface being attached to each framework; an annular distributing gutter attached to each framework, and having a downwardly directed opening for distributing distilland to an inner annular portion of the associated evaporator surface; a gutter for collecting residual distilland and a gutter for collecting distillate being attached respectively of the outer peripheries of the evaporating and condensing surfaces; a vacuum-tight jacket within which all the foregoing elements are enclosed; means for transferring distillate from each peripheral condenser gutter to the next higher distributing gutter, and means for transferring residual distilland from each peripheral evaporator gutter to the next lower distributing gutter.

References Cited by the Examiner

UNITED STATES PATENTS

| | | | |
|---|---|---|---|
| 2,218,240 | 10/1940 | Hickman | 202—205 |
| 2,298,377 | 10/1942 | Hickman | 203—72 |
| 2,313,175 | 3/1943 | Scott et al. | 203—89 |
| 2,396,374 | 3/1946 | Hickman | 202—205 |
| 2,460,602 | 2/1949 | Semon | 202—236 |
| 2,636,555 | 4/1953 | Klepetko et al. | 159—48 |
| 2,694,675 | 11/1954 | Hogan | 202—205 |
| 2,894,879 | 7/1959 | Hickman | 203—26 |
| 3,020,211 | 2/1962 | Smith | 203—72 |
| 3,060,107 | 10/1962 | Smith | 203—72 X |
| 3,136,707 | 6/1964 | Hickman | 202—205 X |

FOREIGN PATENTS 731,608  6/1955  Great Britain.

NORMAN YUDKOFF, *Primary Examiner.*

GEORGE T. MITCHELL, WILBUR L. BASCOMB, JR.,
*Examiners.*